United States Patent
Kang et al.

(10) Patent No.: US 8,683,365 B2
(45) Date of Patent: Mar. 25, 2014

(54) SYSTEM AND METHOD FOR CONTROLLING SEMICONDUCTOR MANUFACTURING EQUIPMENT USING USER INTERFACE

(75) Inventors: Young Soon Kang, Cheonan-si (KR); Dong Yeon Kang, Asan-si (KR)

(73) Assignee: Semes Co., Ltd., Chungcheongnam-Do (KR)

( * ) Notice: Subject to any disclaimer, the term of this patent is extended or adjusted under 35 U.S.C. 154(b) by 1097 days.

(21) Appl. No.: 12/591,630

(22) Filed: Nov. 25, 2009

(65) Prior Publication Data

US 2010/0131892 A1    May 27, 2010

(30) Foreign Application Priority Data

Nov. 27, 2008    (KR) .................. 10-2008-0118516

(51) Int. Cl.
*G06F 3/048*    (2013.01)
(52) U.S. Cl.
USPC ............ 715/771; 715/810; 715/835; 715/854
(58) Field of Classification Search
USPC .................... 715/810, 835, 854, 772, 771
See application file for complete search history.

(56) References Cited

U.S. PATENT DOCUMENTS

| | | | |
|---|---|---|---|
| 5,644,686 A * | 7/1997 | Hekmatpour | 706/45 |
| 6,142,660 A * | 11/2000 | Utsunomiya et al. | 700/121 |
| 6,772,034 B1 * | 8/2004 | Shi et al. | 700/121 |
| 7,260,777 B2 | 8/2007 | Fitzsimons et al. | |
| 7,384,601 B2 * | 6/2008 | Matsubara et al. | 422/67 |
| 7,769,482 B2 * | 8/2010 | Pannese et al. | 700/121 |
| 7,778,719 B2 * | 8/2010 | Chen et al. | 700/95 |
| 7,899,562 B2 * | 3/2011 | Pannese et al. | 700/48 |
| 2003/0149503 A1 * | 8/2003 | Kawase et al. | 700/99 |
| 2004/0015808 A1 * | 1/2004 | Pang et al. | 716/19 |

(Continued)

FOREIGN PATENT DOCUMENTS

| | | |
|---|---|---|
| CN | 1980350 | 6/2007 |
| JP | 62-022141 | 1/1987 |

(Continued)

OTHER PUBLICATIONS

Paul K. Andersen, "Just Enough UNIX $3^{rd}$ Edition" and English translation thereof, (Aug. 20, 2000).

*Primary Examiner* — Daeho Song
(74) *Attorney, Agent, or Firm* — Harness, Dickey & Pierce, P.L.C.

(57) ABSTRACT

Provided is a system and method for controlling a semiconductor manufacturing equipment by means of a user interface. The control system connects at least one controller through a network to a plurality of semiconductor manufacturing equipments. The controller includes a superordinate controller such as a host for remote control and a subordinate controller such as a cluster tool controller. The controller includes a user interface application for controlling, monitoring and managing the semiconductor manufacturing equipment. The user interface application provides a navigation menu in one side region of a screen to display menus, accessed by a user, in the order of history. The navigation menu is provided in the type of menu bars corresponding to the menus accessed by the user. The navigation menu is configured to automatically store data corrected by the user, prior to conversion to another menu. The menus accessed by the user can be rapidly selected by means of the user interface, and the loss of the corrected data in the accessed menu can be prevented.

16 Claims, 11 Drawing Sheets

(56) References Cited

U.S. PATENT DOCUMENTS

| | | | | |
|---|---|---|---|---|
| 2004/0119749 A1* | 6/2004 | Luque | ............................. | 345/771 |
| 2005/0047645 A1* | 3/2005 | Funk et al. | ..................... | 382/145 |
| 2005/0108653 A1* | 5/2005 | Langridge | ...................... | 715/771 |
| 2007/0276527 A1* | 11/2007 | Chen et al. | ........................ | 700/96 |
| 2008/0155449 A1* | 6/2008 | Pannese et al. | ................ | 715/772 |
| 2009/0132637 A1* | 5/2009 | Ando | ............................. | 709/201 |
| 2009/0259961 A1* | 10/2009 | Bakli et al. | ..................... | 715/772 |

FOREIGN PATENT DOCUMENTS

| | | |
|---|---|---|
| JP | 05-120350 | 5/1993 |
| JP | 07-005858 | 1/1995 |
| JP | 2002-259012 | 9/2002 |
| JP | 2003-347179 | 12/2003 |
| JP | 2005-522043 | 7/2005 |
| JP | 2005-309996 | 11/2005 |
| JP | 2006-113705 | 4/2006 |
| JP | 2008-004702 | 1/2008 |
| KR | 1998-038692 | 8/1998 |
| KR | 10-2006-0129633 | 12/2006 |
| KR | 10-2008-0040407 | 5/2008 |
| TW | I239460 B | 9/2005 |

\* cited by examiner

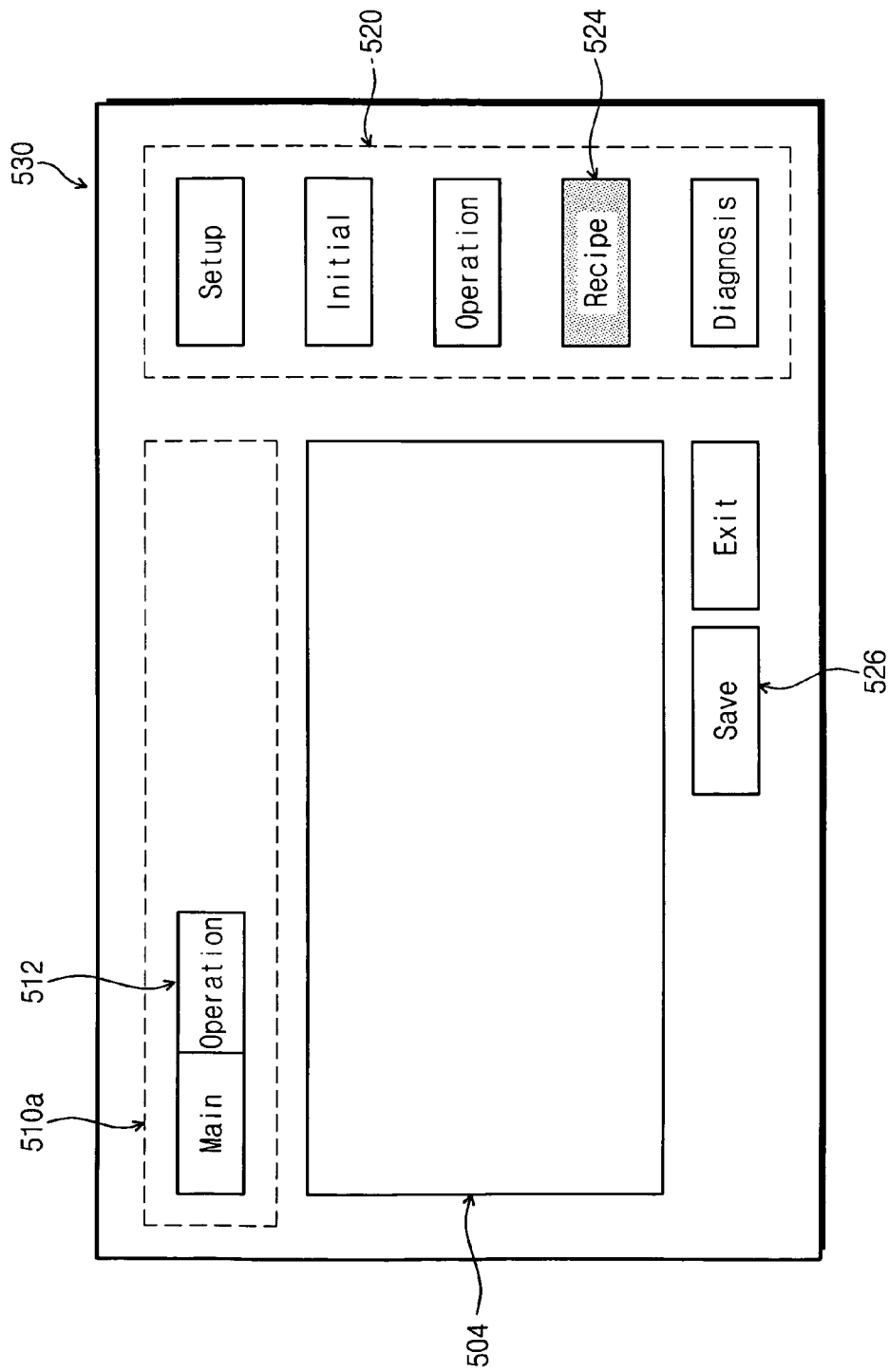

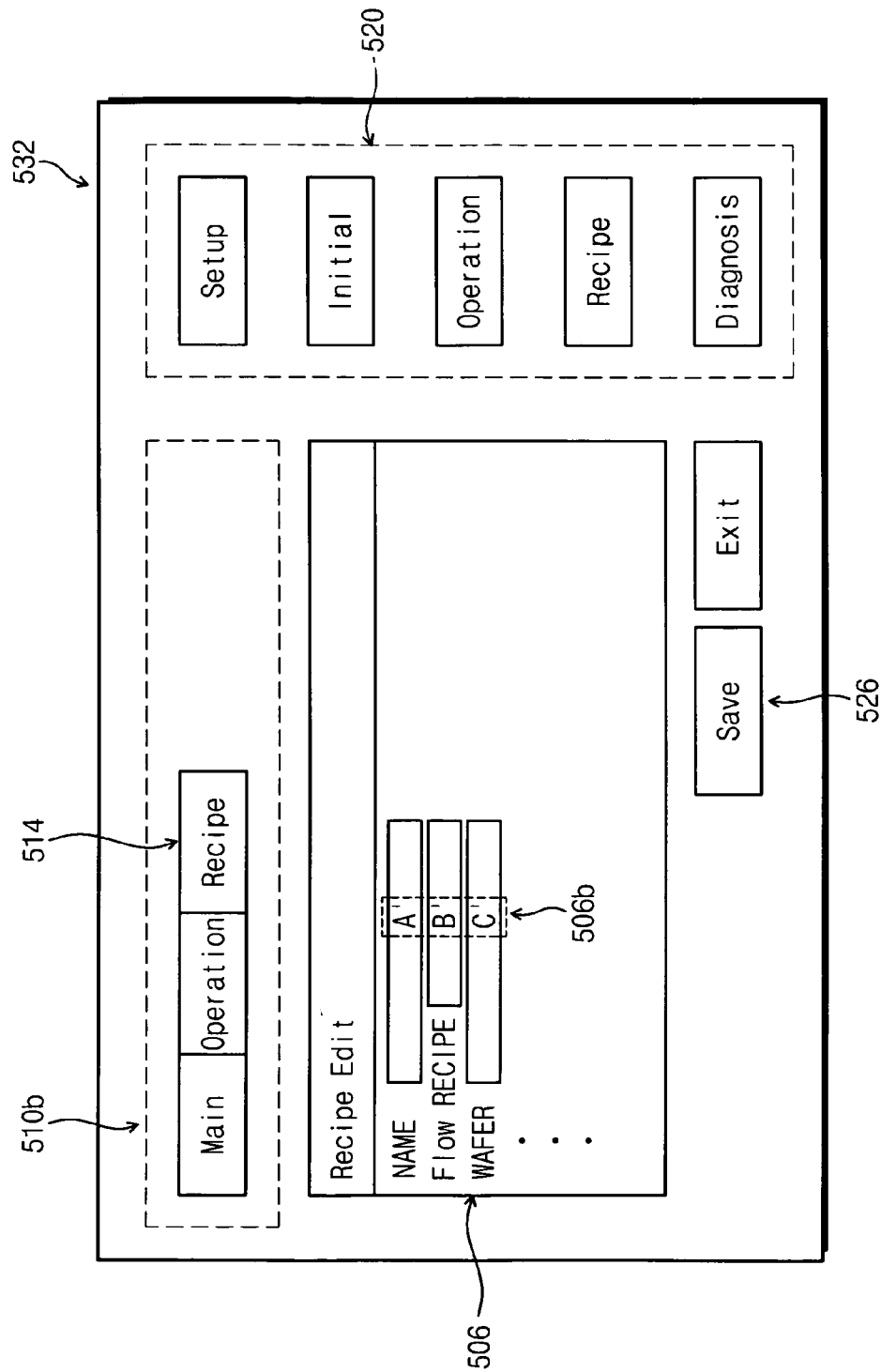

SYSTEM AND METHOD FOR CONTROLLING SEMICONDUCTOR MANUFACTURING EQUIPMENT USING USER INTERFACE

CROSS-REFERENCE TO RELATED APPLICATIONS

This U.S. non-provisional patent application claims priority under 35 U.S.C. §119 of Korean Patent Application No. 10-2008-0118516, filed on Nov. 27, 2008, the entire contents of which are hereby incorporated by reference.

BACKGROUND OF THE INVENTION

The present invention disclosed herein relates to control systems, and more particularly, to systems and methods for controlling, monitoring and managing a semiconductor manufacturing equipment by means of a user interface.

In general, many manufacturing processes are necessary to produce semiconductor products. In order to control such manufacturing processes, various semiconductor manufacturing equipments are constructed in the production line. In order to control various processes, the semiconductor manufacturing equipment has a control system connected through a network. For example, the control system includes a programmable logic controller or a computer. The control system sets a process recipe including process conditions and process flows to control the semiconductor manufacturing equipments. The control system monitors the respective components for control of the process recipe to mange process-related information. The semiconductor manufacturing equipment includes various components according to the manufacturing processes. In general, the semiconductor manufacturing equipment includes process units for processing substrates and a transport unit for transporting the substrates.

The control system of the semiconductor manufacturing equipment communicates data through the network to control, monitor and manage the respective processes of the semiconductor manufacturing equipment.

To this end, the control system has a control program. The control program uses the user interface to control, monitor and manage the semiconductor manufacturing equipments. The user interface has various menus necessary to set, monitor and operate the process recipes for the respective units. For example, more than hundreds of menus are provided for each semiconductor manufacturing equipment. The user may use such menus to control, monitor and analyze information according to the process of the semiconductor manufacturing equipment. In a loading mode, the user interface loads a plurality of operable menu screens into the initial main screen. In a menu selection mode, the user interface displays various information and submenus in the top side region of the selected menu screen.

In the menu selection mode, if data corrected by the user are present in the previous screen, the corrected data are lost because a conversion is made from the previous screen to the selected screen. For example, when a plurality of menus are correlated to create data, the data under creation are lost if a conversion is made from a first menu to another menu before completion of the data creation in the first menu in order to detect other data related with the data. In this case, the user is inconvenienced by having to re-create the data. Also, the screen is refreshed because the user interface receives and processes data about the menu whenever selecting the screen. In this case, the screen is converted without storage of data under edit or correction.

Also, if the user has accessed various menus by means of the user interface, even when the user desires to re-access the accessed menus, the user must select the desired menu through several menu selection processes for re-selection of the location of the desired menu. Thus, the user is inconvenienced by having to repeat the same process in order to re-access the accessed menu.

SUMMARY OF THE INVENTION

Embodiments of the present invention provide systems and methods for controlling a semiconductor manufacturing equipment by means of a user interface.

Embodiments of the present invention also provide systems and methods for controlling a semiconductor manufacturing equipment, which make it possible to easily control an access to various menus by means of a navigation menu for displaying menus, accessed by a user, in the order of history.

Embodiments of the present invention also provide systems and methods for controlling a semiconductor manufacturing equipment, which make it possible to prevent a data loss in screen conversion by means of a user interface.

The control system according to the present invention uses a user interface to control, monitor and manage a semiconductor manufacturing equipment. The control system provides a navigation menu based on a user interface, thus facilitating transfer between menus accessed by a user.

In some embodiments of the present invention, systems for controlling a semiconductor manufacturing equipment include: a plurality of menu dialogues configured to control, monitor and manage the semiconductor manufacturing equipment; a navigation menu configured to display the menu dialogues accessed by a user; a navigation controller configured to enable the navigation menu and register and manage the navigation menu; and a display driver configured to display the navigation menu on a screen.

In other embodiments, the navigation menu is display in a menu bar type.

In further embodiments, the navigation menu is disposed in the top side region of the screen and sequentially provides the menu bars corresponding respectively to the menu dialogues accessed by the user.

In still further embodiments, the systems further include a data buffer configured to store data corrected in the menu dialogue accessed by the user.

In still further embodiments, if a conversion is made from the currently-accessed menu dialogue to another menu dialogue without storage of the corrected data, the navigation controller stores the corrected data in the data buffer.

In still further embodiments, if a conversion is made from the currently-accessed menu dialogue to another menu dialogue without storage of the corrected data, the navigation controller automatically stores the corrected data in the data buffer before the menu conversion.

In still further embodiments, the navigation controller displays the menu bar corresponding to the menu dialogue without the corrected data and the menu bar corresponding to the menu dialogue with the corrected data, which are included in the navigation menu, differently from each other.

In still further embodiments, the systems further include a data storage configured to store data for displaying the menu dialogues and the navigation menu on the screen.

In still further embodiments, the systems further include a user interface data processor configured to read the screen display data from the data storage.

In still further embodiments, if the user selects one of the menu dialogues, the navigation controller transmits to the user interface data processor a request signal for data to display the selected menu dialogue on the screen. The user interface data processor reads the screen display data from the data storage in response to the request signal and provides the read screen display data to the navigation controller.

In still further embodiments, the display driver displays the currently-accessed menu dialogue and the navigation menu in the top side region of the screen.

In still further embodiments, the systems including a subordinate controller connected to the semiconductor manufacturing equipment and a superordinate controller connected to the subordinate controller. Herein, at least one of the subordinate controller and the superordinate controller may include a user interface application.

In still further embodiments, the subordinate controller includes a client tool controller that is connected through an internal network to the semiconductor manufacturing equipment.

In still further embodiments, the superordinate controller includes a host that is connected through an external network to the semiconductor manufacturing equipment to remotely the semiconductor manufacturing equipment.

In other embodiments of the present invention, methods for controlling a semiconductor manufacturing equipment by means of a user interface include: loading a user interface including menus for controlling, monitoring and managing the semiconductor manufacturing equipment; displaying a main screen for selecting one of the menus; and displaying a navigation menu for registering the selected menus on the main screen in the order of history.

In some embodiments, the displaying of the navigation menu includes: disposing the navigation menu in the top side portion of the main screen; and displaying the navigation menu in the types of menu bars corresponding respectively to the menus selected by the user.

In other embodiments, the displaying of the navigation menu includes: registering and displaying a new menu bar in the navigation menu when a conversion is made from the currently-accessed menu to another menu corresponding to each of the menus selected by the user.

In further embodiments, the displaying of the navigation menu includes: displaying the menu bar corresponding to the menu among the selected menus including data corrected by the user and the menu bar corresponding to the menu without the corrected data, differently from each other.

In still further embodiments, the displaying of the navigation menu includes: displaying the menu bar corresponding to the menu including the corrected data in the same manner as the menu bar corresponding to the menu without the corrected data if the corrected data are stored by the user.

In still further embodiments, the methods further include: storing the corrected data before the menu conversion.

In further embodiments of the present invention, methods for controlling a semiconductor manufacturing equipment by means of a user interface including menu dialogues of menus for controlling, monitoring and managing the semiconductor manufacturing equipment include: loading the user interface; displaying a main screen among the menu dialogues; enabling a navigation menu for displaying the menu dialogues selected by a user; and registering, upon selecting one or more of the menu dialogues, the selected menu dialogues in the navigation menu in the order of history.

In some embodiments, the enabling of the main menu includes: displaying each of the menu dialogues, accessed by the user, in the navigation menu in a menu bar type.

In other embodiments, the screen conversion is possible between the menu dialogues registered and displayed in the navigation menu.

In further embodiments, the methods further include: determining whether corrected data are present in the previous menu dialogue, if a conversion is made from the previous menu dialogue to one of the menu dialogues registered and displayed in the navigation menu.

In still further embodiments, the methods further include: automatically storing the corrected data if the corrected data are present in the previous menu dialogue.

In still further embodiments, the navigation menu displays the menu bar with the corrected data and the menu bard without the corrected data differently from each other.

In still further embodiments, the navigation menu displays the menu bar with the corrected data in the same manner as the menu bar without the corrected data if the corrected data are stored.

In still further embodiments, the navigation menu is displayed in the top side region of the screen.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIGS. 6A to 6E and 7 illustrate user interface screens displaying a navigation menu according to an embodiment of the present invention.

DETAILED DESCRIPTION OF PREFERRED EMBODIMENTS

Figure 1:
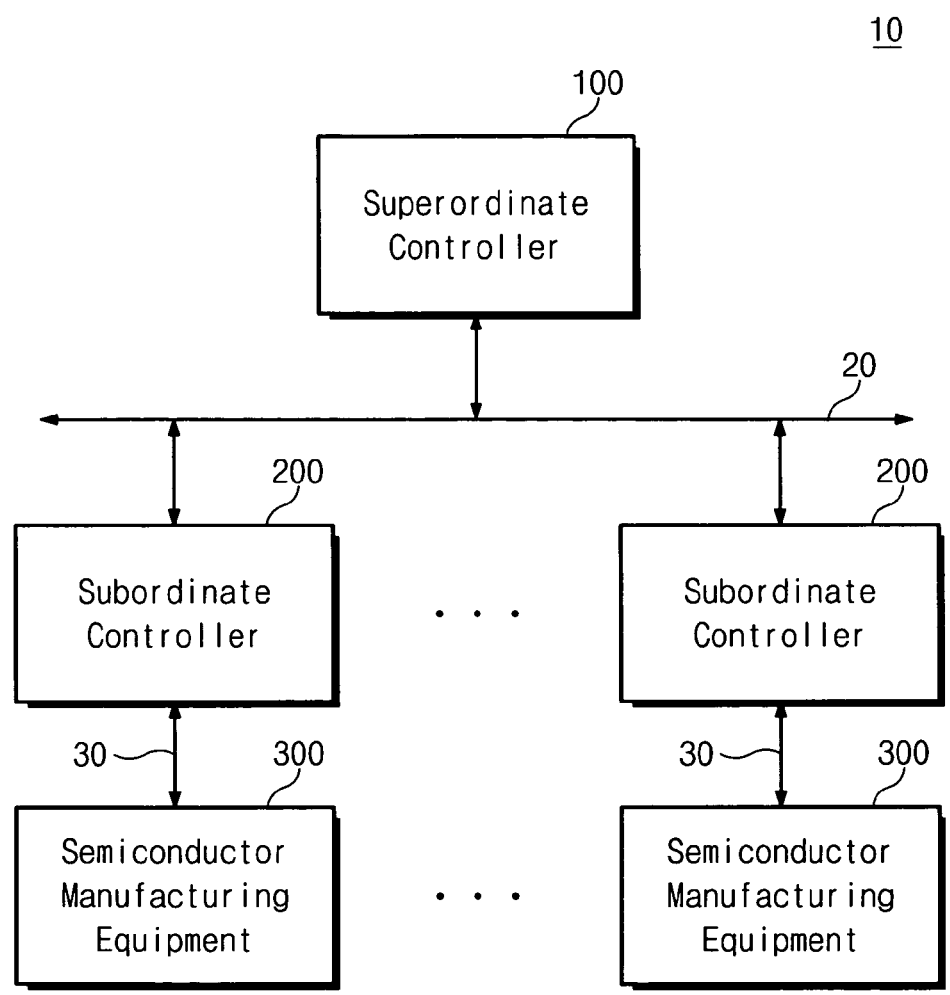
FIG. 1 is a block diagram of a network configuration of a control system for controlling a semiconductor manufacturing equipment according to an embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Thus, in the drawings, the dimensions and shapes of elements or components are exaggerated for clarity of illustration.

Hereinafter, exemplary embodiments of the present invention will be described in detail with reference to the accompanying drawings.

FIG. 1 is a block diagram of a network configuration of a control system for controlling a semiconductor manufacturing equipment according to an embodiment of the present invention.

Referring to FIG. 1, a control system 10 uses a user interface to control, monitor and manage a semiconductor manufacturing equipment 300. The control system 10 connects a plurality of semiconductor manufacturing equipments 300 through a network 20 and 30 to at least one controller 100/200. The semiconductor manufacturing equipments 300 may perform the same process or different processes. For example, although not illustrated in FIG. 1, the semiconductor manufacturing equipment 300 includes various units such as process units for processing wafers (or substrates) and a transport unit for transporting the wafers between the respective units.

The controller 100/200 includes a superordinate controller 100 and a subordinate controller 200. The controller 100/200 uses a user interface to control, monitor and manage the semiconductor manufacturing equipments 300.

For example, the superordinate controller 100 includes a host, and is connected through an external network 20 to a plurality of subordinate controllers 200. The external network 20 includes a communication network using protocols such as TCP/IP. The superordinate controller 100 exchange information with the subordinate controller 200 through the external network 20 to remotely control the semiconductor manufacturing equipment 300.

The subordinate controller 200 includes a controller, a programmable logic controller and a personal computer (PC), and is connected through an internal network 30 to the semiconductor manufacturing equipment 300. The internal network 30 includes communication networks such as a serial communication interface and a Local Area Network (LAN). The superordinate or subordinate controller 100 or 200 may include different Cluster Tool Controllers (CTCs). The superordinate controller 100 may include a Fault Detection and Classification (FDC) system, and the subordinate controller 200 may include a CTC. The superordinate and subordinate controllers 100 and 200 use a user interface to exchange information about a semiconductor manufacturing equipment with each other in order to control, monitor and manage the semiconductor manufacturing equipment.

Figure 2:
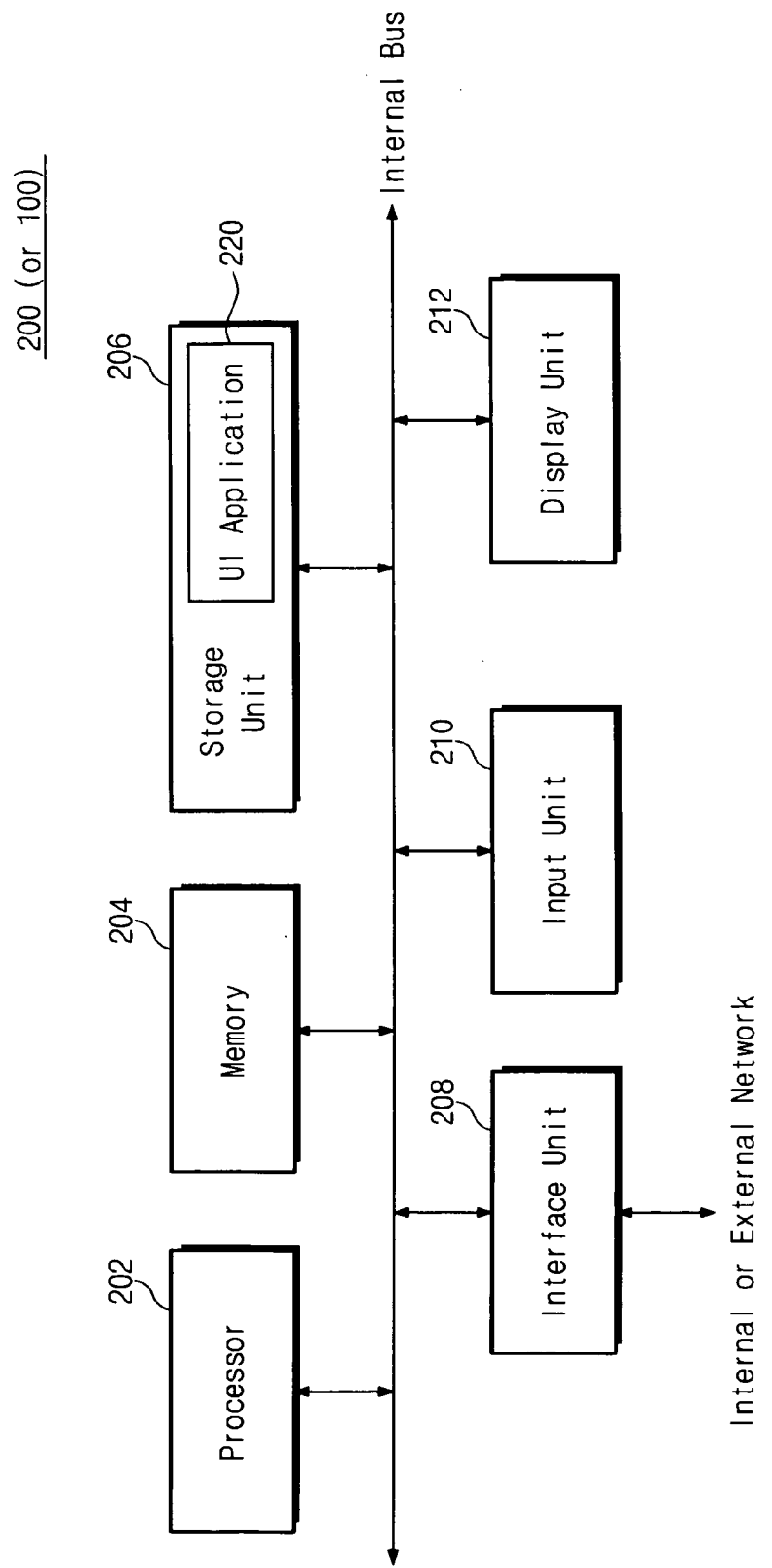
FIG. 2 is a block diagram of a superordinate or subordinate controller illustrated in FIG. 1.

FIG. 2 is a block diagram of the superordinate or subordinate controller 100 or 200 illustrated in FIG. 1.

Referring to FIG. 2, the superordinate or subordinate controller 100 or 200 includes components of a typical computer device. For example, the superordinate or subordinate controller 100 or 200 includes a processor 202, a memory 204, a storage unit 206, an interface unit 208, an input unit 210, and a display unit 212. The respective components are connected to an internal bus. The interface unit 208 is connected to the internal or external network 30 or 20 (see FIG. 1). Hereinafter, the technical features of the present invention will be described in detail on the basis of the subordinate controller 200.

That is, the subordinate controller 200 includes a CTC. In this case, the superordinate controller 100 may include another CTC or a host.

The storage unit 206 includes a User Interface (UI) application 220 according to the present invention.

Figure 3:
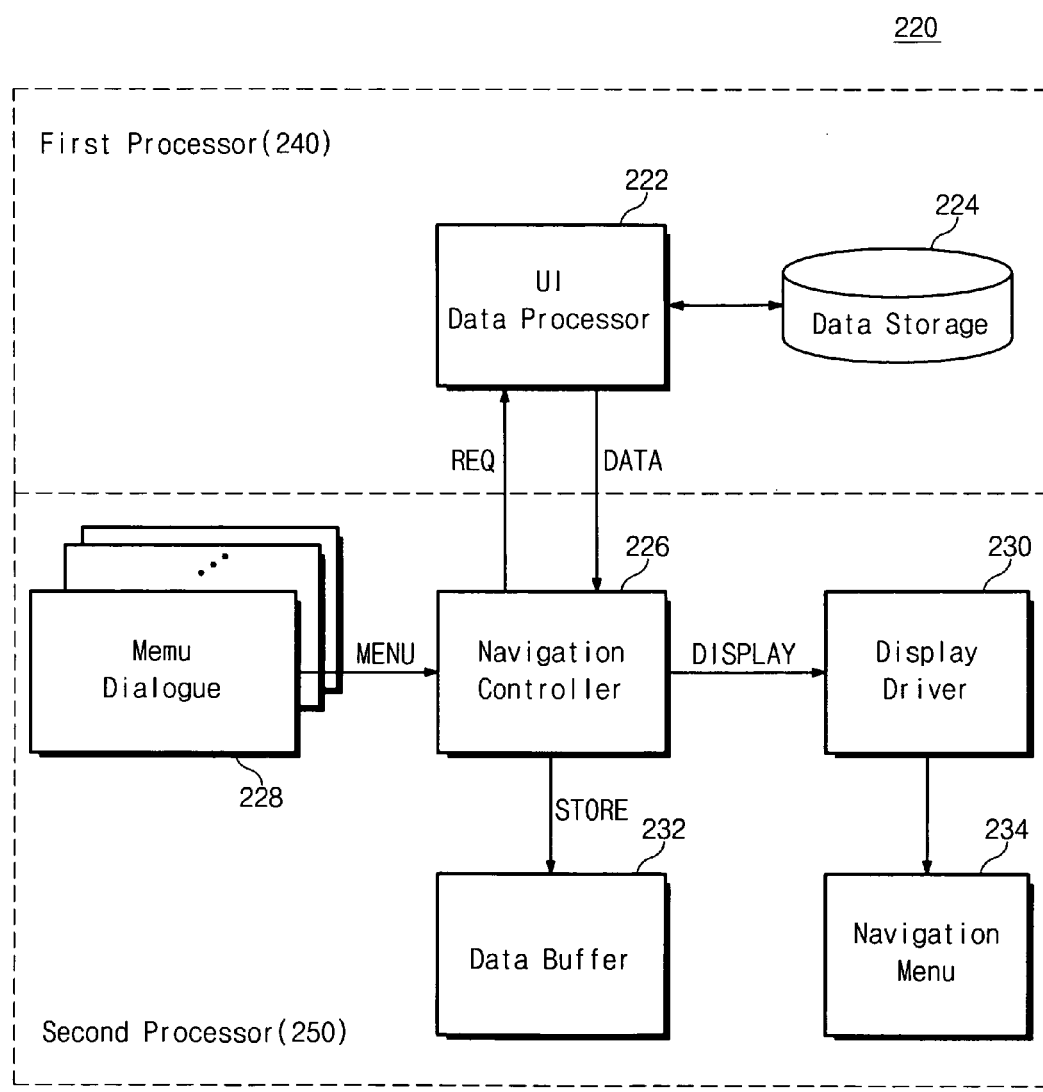
FIG. 3 is a block diagram of a user interface application of the superordinate or subordinate controller illustrated in FIG. 2.

FIG. 3 is a block diagram of the UI application 220 of the superordinate or subordinate controller illustrated in FIG. 2.

Referring to FIG. 3, the UI application 220 provides a navigation menu 234 for displaying menus, accessed by a user, in the order of history. Also, the UI application 220 includes a plurality of menu dialogues 228, a UI processor 222, a data storage 224, a navigation controller 226, a data buffer 232, and a display driver 230.

The UI application 220 includes a first processor 240 for processing data about the user interface, and a second processor 250 for processing screen display for the user interface to display a navigation menu 234 in the screen. That is, the first processor 240 includes the UI data processor 222 and the data storage 224, and the second processor 250 includes the menu dialogues 228, the UI data processor 222, the data storage 224, the navigation controller 226, the data buffer 232, the display driver 230, and the navigation menu 234.

The menu dialogues 228 include information about various menus for controlling, monitoring and managing the semiconductor manufacturing equipments 300. For example, more than hundreds of such menus are provided for each semiconductor manufacturing equipment. Thus, the menu dialogues 228 are also provided in corresponding numbers. And the respective menu dialogues 228 are provided in screen display for the user interface.

The UI data processor 222 processes screen display for the user interface of the UI application 220. The UI data processor 222 loads the user interface. Also, the UI data processor 222 transmits data DATA and commands REQ for the user interface between the navigation controller 226 and the data storage 224.

The data storage 224 stores various data and information to be displayed by the UI application 220. The data storage 224 stores information and data for displaying the menu dialogues 228 and the navigation menu 234 on the screen. The UI data processor 222 stores/reads data in/from the data storage 224.

The navigation controller 226 enables the navigation menu 234 on the screen when the user interface is loaded by the UI data processor 222. The navigation controller 226 registers, displays and manages menus, accessed by the user, in the order of history, in the navigation menu 234. For example, the navigation menu 234 is displayed in one side region of the screen in the type of menu bars corresponding respectively to the menu dialogues accessed by the user.

The data buffer 232 stores data that are corrected or are being edited in the currently-accessed menu dialogue.

The display driver 230 displays data that are provided from the data storage 224 by the navigation controller 226. Herein, the display driver 230 is configured to display the navigation menu 234 and the currently-accessed menu dialogue among the menu dialogues 228 in the top side (uppermost) region of the screen.

When the user selects one of the menu dialogues 228, the UI application 220 transmits from the navigation controller 226 to the UI data processor 222 a request signal REQ for data to display the selected menu dialogue on the screen. In response to the request signal REQ, the UI data processor 222 reads data for the screen display from the data storage 224 and provides the read data to the navigation controller 226. Accordingly, the navigation controller 226 provides the data to the display driver 230 to display the selected menu dialogues on the screen, so that the selected menu dialogues are displayed on the screen in the order selected. Herein, the navigation menu 234 is displayed in one side region of the screen in the type of menu bars corresponding respectively to the selected menu dialogues in the order selected. Also, if data needing to be stored are present in the previous screen, the navigation controller 226 controls the data to be automatically stored in the data buffer 232 prior to conversion between the menu dialogues 228.

Figure 4:
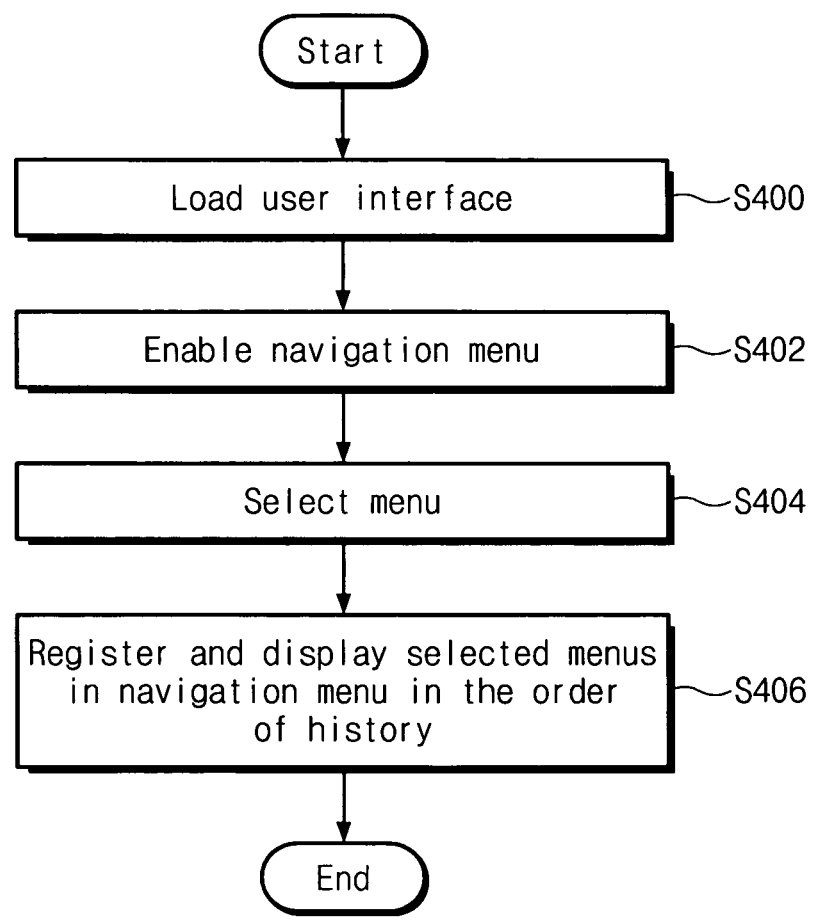
FIG. 4 is a flow chart illustrating a process for controlling a user interface with a navigation menu according to the present invention.

FIG. 4 is a flow chart illustrating a process for controlling the user interface with the navigation menu according to the present invention.

Referring to FIG. 4, in step S400, the superordinate or subordinate controllers 100 or 200 executes the UI application 220 to load the user interface. For example, the display unit 212 displays a main screen of the UI application 220. The main screen includes various menus for controlling, monitoring and managing the semiconductor manufacturing equipment 300. In step S402, the navigation menu 234 is enabled and displayed in one side region of the main screen. In step S404, the user selects one of the various menus. The selected menu is displayed a screen including the navigation menu 234. In step S406, when the menu selection is repeated, the selected menus are registered and displayed in the navigation menu 234 in the order of history.

Hereinafter, a process for controlling the navigation menu according to an embodiment of the present invention will be described in detail with reference to FIGS. 5 to 7.

Figure 5:
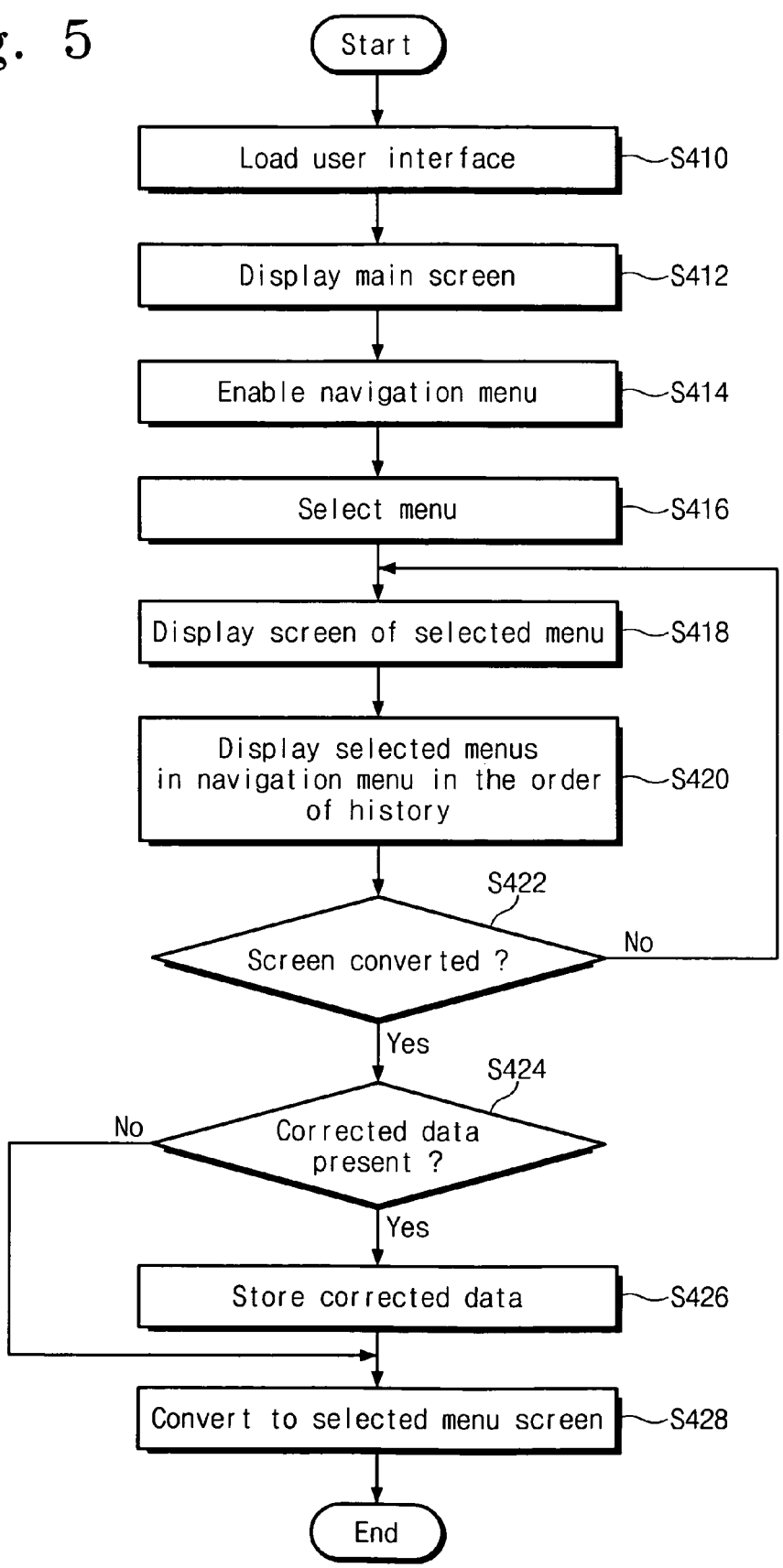
FIG. 5 is a flow chart illustrating a process for controlling a user interface with a navigation menu according to an embodiment of the present invention.

FIG. 5 is a flow chart illustrating a process for controlling the user interface with the navigation menu according to an embodiment of the present invention. That is, FIG. 5 illustrates a process for controlling the navigation menu through the user interface according to an embodiment of the present invention. FIGS. 6A to 6E and 7 illustrate UI screens displaying the navigation menu according to an embodiment of the present invention. The menu control process will be described on the basis of the UI screens illustrated in FIGS. 6A to 6E and 7.

Figure 6A:
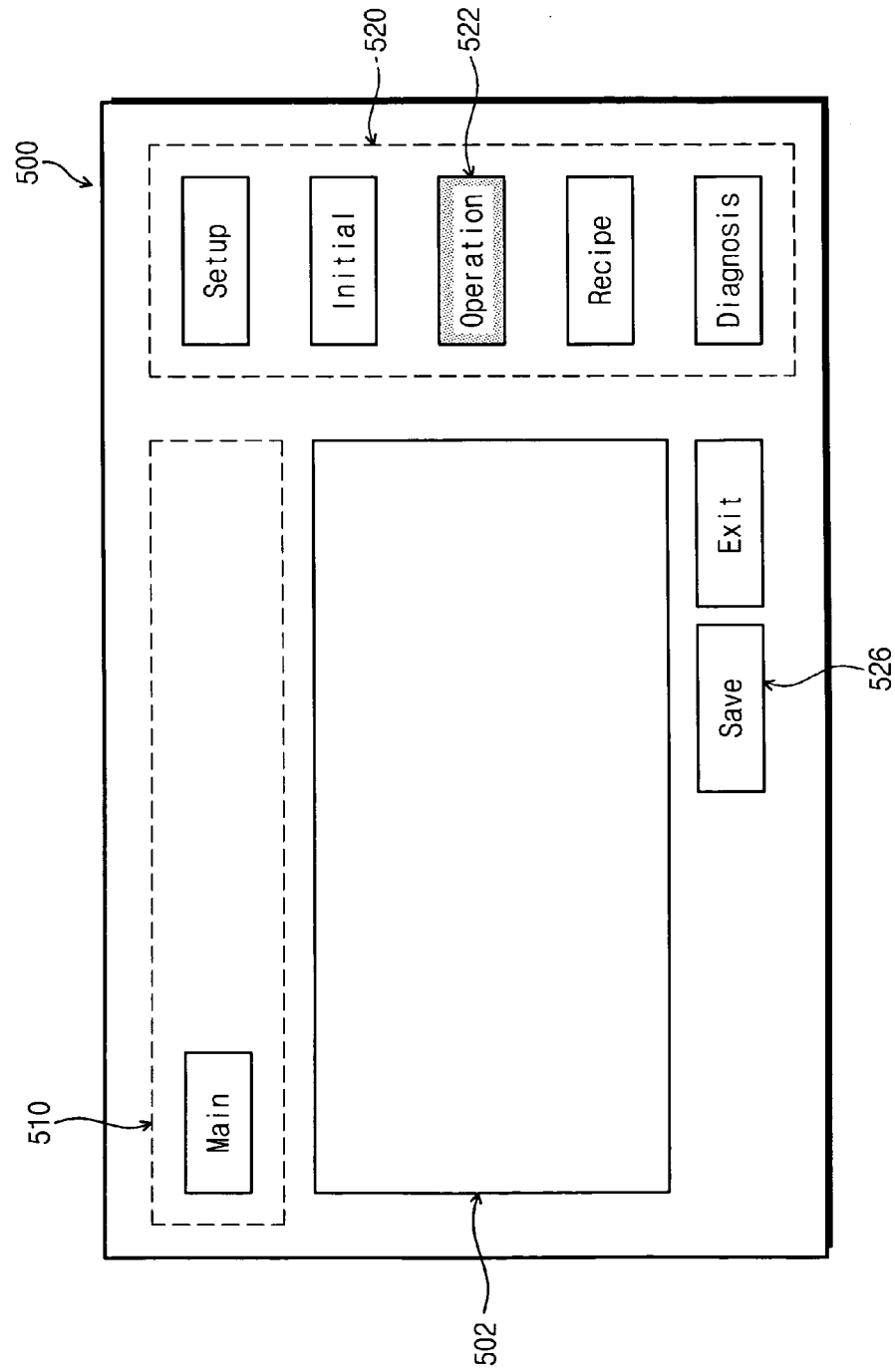

Referring to FIG. 5, when the user interface is loaded in step S410, a main screen 500 is displayed in step S412 as illustrated in FIG. 6A. In step S414, a navigation menu 510 is enabled and displayed in the top side region of the main screen 500. The main screen 500 is one of the menu dialogues 228. The main screen 500 includes selection buttons 520 for selecting one of the menu dialogues 228 for controlling, monitoring and managing the semiconductor manufacturing equipment 300. One of the selection buttons 520 may be selected to output another sub screen 540 in FIG. 6E, and a plurality of other selection buttons 542 may be displayed in the sub screen 540. The sub screen 540 is also provided in the menu dialogue 228. The main screen 500 includes a display region 502 for displaying various information corresponding to the selection button 520. Each of menu dialogues for other menus may also include a display region (502~508 in FIGS. 6A to 6E and 7) for displaying various information. The display region 502~508 includes various information about the corresponding selection button, such as operation states, process conditions, processing situations, and images of specific units of the semiconductor manufacturing equipment 300. The various information includes correctible data. The main screen 500 also includes a plurality of command buttons 526 for executing various commands for performing an END operation and correcting or storing data provided in the display region 502. Also, the main screen 500 includes navigation menu 510 in one side of the display region 502.

When the user presses one of the selection buttons 522 on the main screen 500 to select one of the menus in step S416, a menu dialogue 530 for the selected menu is displayed in step S418 as illustrated in FIG. 6B. The menu selection may be repeated plural times or may repeat various menu dialogues in order to control the semiconductor manufacturing equipments 300.

Figure 6C:
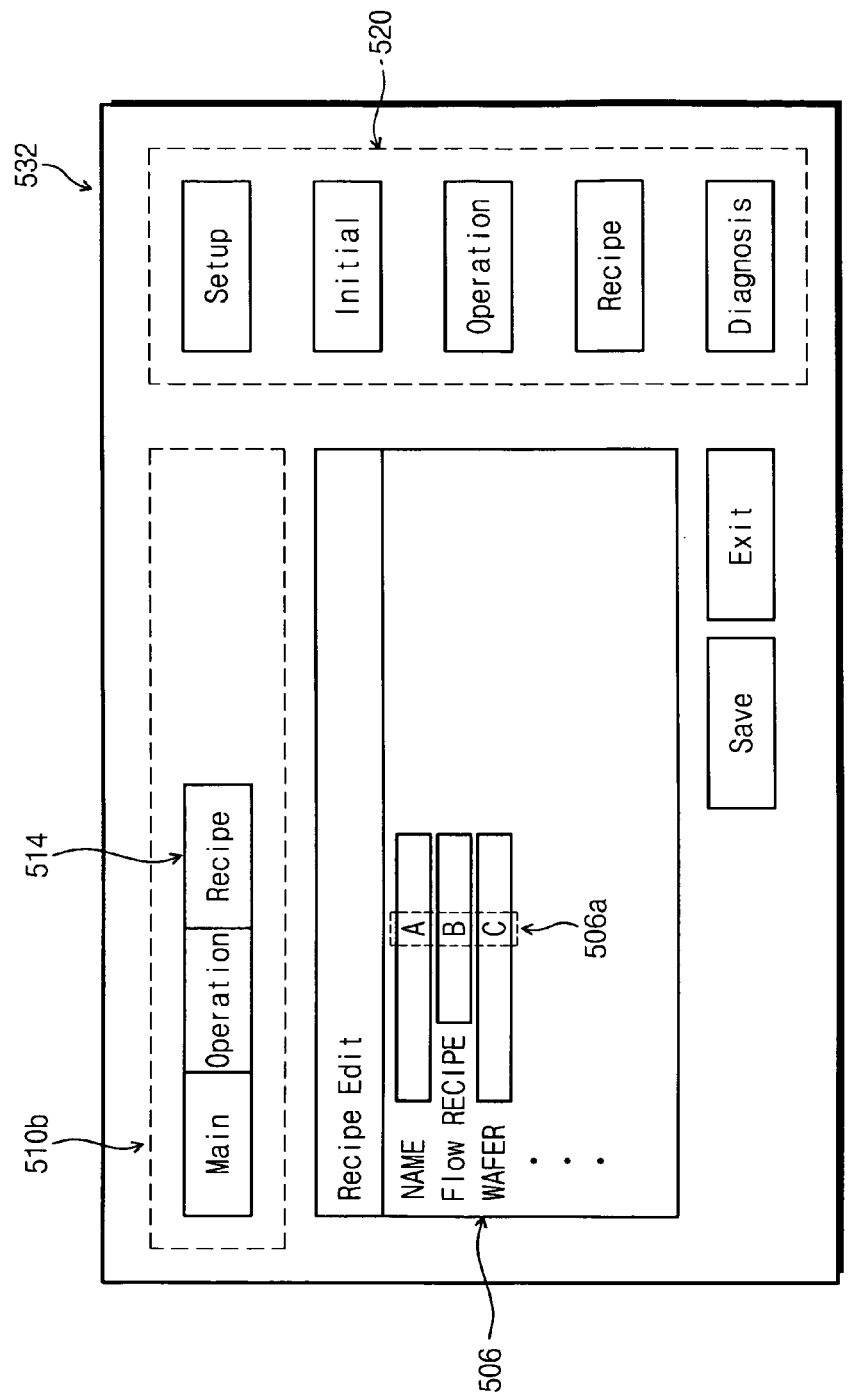

In step S420, a menu bar 512 for the previous main screen 500 is registered and displayed in the navigation menu 510 in the top side region of the main screen 500. The navigation menu 510 is displayed in the type of menu bars corresponding respectively to the menu dialogues accessed by the user. When another of the selection buttons 524 is selected to select another of the menus, a menu bar 514 for the previous display menu dialogue 530 is registered and displayed in a navigation menu 510b as illustrated in FIG. 6C. That is, the menus accessed by the user are registered in the navigation menu 510 (510a, 510b) in the order of history.

In step S422, it is determined whether another menu is selected to convert the menu screen. That is, as illustrated in FIGS. 6C and 6D, when another menu is selected, the menu control process proceeds to step S424. In step S424, it is determined whether data 506a are corrected in the previous menu screen 532. If corrected data 506b are present, the menu control process proceeds to step S426. In step S426, the navigation controller 226 automatically stores the corrected data 506b of the previous menu screen in the data buffer 232. In step S428, it converts to a menu screen for the currently selected menu.

Figure 6E:
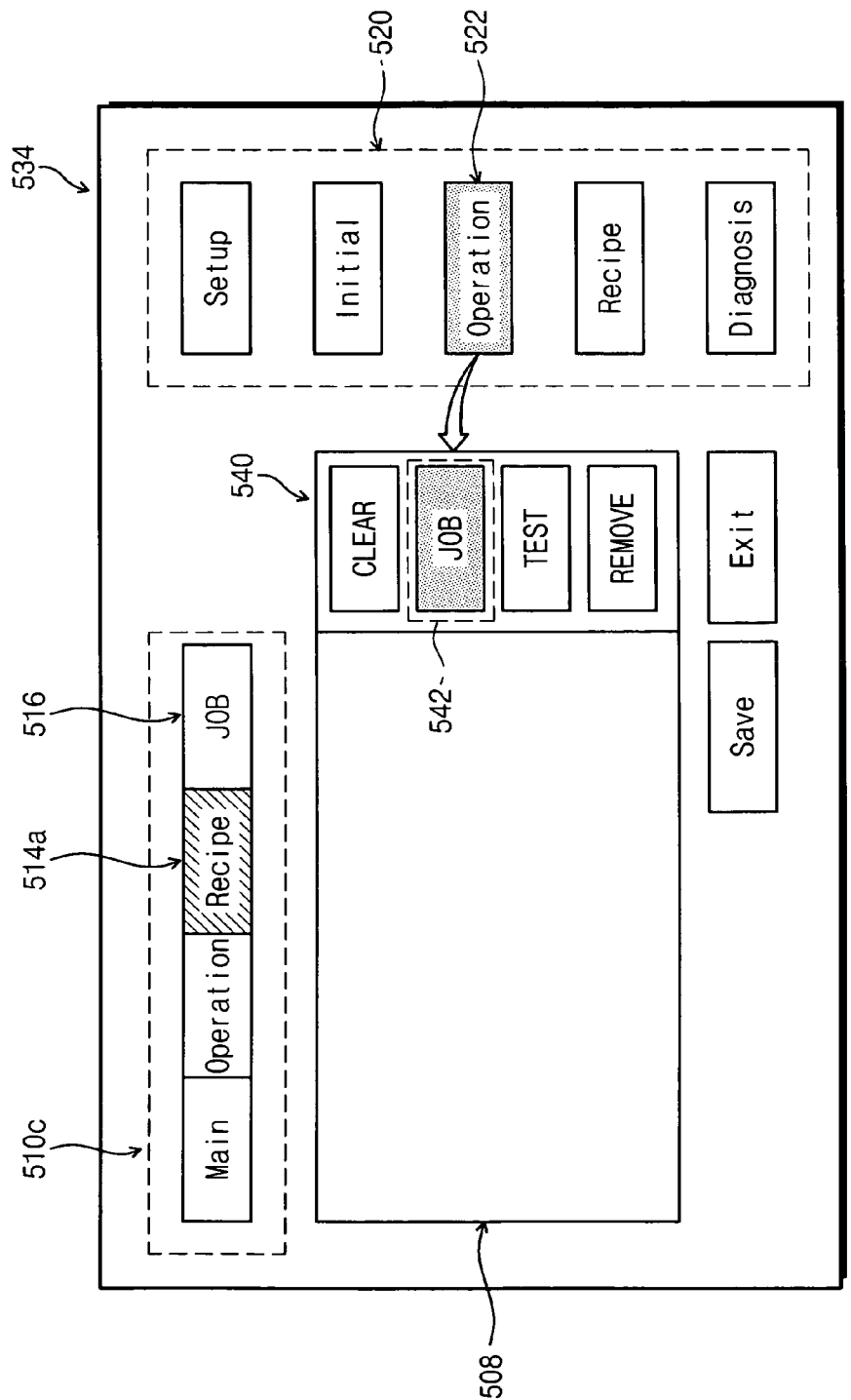

Also, as illustrated in FIG. 6E, when still another menu is selected, the menu control process proceeds to step S420 to register and display a menu bar 516 for the previous menu screen in a navigation menu 510c. Herein, the navigation menu 510c displays a menu bar 514a for a menu dialogue with the corrected data and a menu bar 516 corresponding to a menu dialogue with the corrected data stored (i.e., a menu dialogue without the corrected data), differently from each other. For example, the menu bar 514a for the menu dialogue with corrected data is displayed in a different color or in a flicker mode.

Also, one of the menu bars 512~516 registered and displayed in the navigation menu 510c is selected to convert to the corresponding menu screen. Herein, one of the selection buttons 522 is pressed to display a corresponding submenu 540. The submenu 540 includes a plurality of other selection buttons 542. In the same manner as described above, the navigation controller 226 registers and displays the menu bar 516 for the selection buttons 542 of the submenu 540 to manage the navigation menu 510c.

Figure 7:
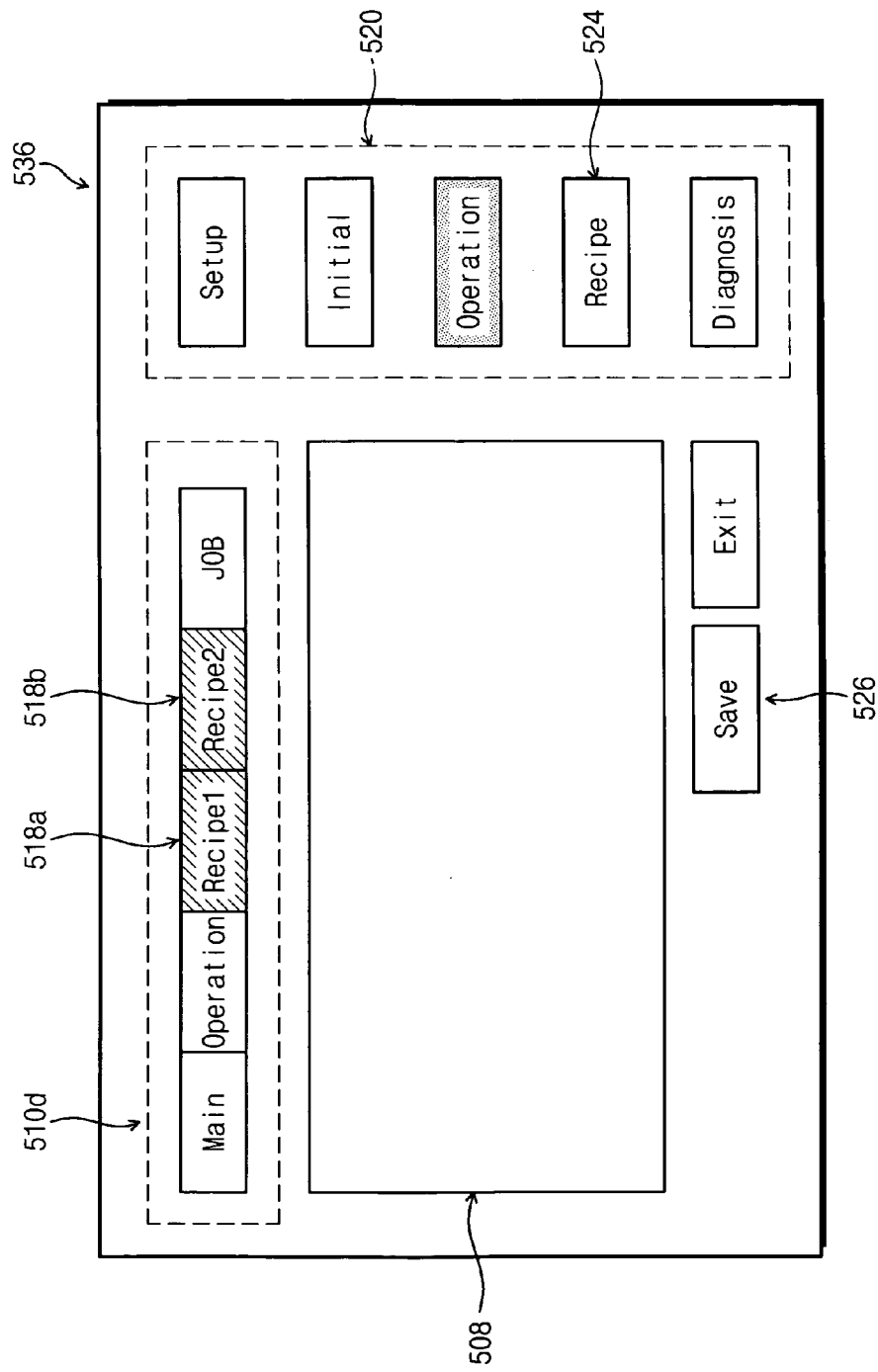

Also, as illustrated in FIG. 7, menu bars 518a and 518b for menu dialogues without stored data may be registered and displayed in the navigation menu 510d. Also, in this case, screen conversion is possible between all the menu bars of the navigation menu 510d. Accordingly, in order to prevent a data loss, the menu bars 518a and 518b for the menu dialogues without stored data may be selected to convert the corresponding menu dialogue, and the corresponding command button 526 may be pressed to store the corrected data.

As described above, the control system according to the present invention uses a navigation menu based on a user interface to control, monitor and manage a semiconductor manufacturing equipment, thereby facilitating transfer between various menus.

Also, the control system automatically stores corrected data present in the previous screen when converting the screen by the navigation menu, thereby making it possible to prevent a data loss.

Also, the control system displays a menu with data, corrected by the user, in the navigation menu, thereby making it possible to prevent a data loss.

Also, the control system uses the navigation menu to display various operation-related menus, accessed by the user, in the order of history, thereby making it easy for the user to select a necessary menu registered and displayed in the navigation menu, without the need to re-search the necessary menu whenever necessary.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for controlling a semiconductor manufacturing equipment, comprising:
a processor and a memory;
a plurality of menu dialogues stored in the memory, the menu dialogues configured to control, monitor and manage the semiconductor manufacturing equipment;
a navigation menu configured to display the menu dialogues accessed by a user;
a navigation controller configured to enable the navigation menu and register and manage the navigation menu;
a display driver configured to display the navigation menu on a screen; and
a data buffer configured to store data corrected in the menu dialogue accessed by the user, wherein
the navigation menu displayed includes one or more menu bars;
the navigation menu is disposed in a top side region of the screen and sequentially provides the menu bars corresponding respectively to the menu dialogues accessed by the user;
if a conversion is made from a currently-accessed menu dialogue to another menu dialogue without storage of the corrected data, the navigation controller stores the corrected data in the data buffer;
if a conversion is made from the currently-accessed menu dialogue to another menu dialogue without storage of the corrected data, the navigation controller automatically stores the corrected data in the data buffer before the menu conversion; and
the navigation controller displays a first set of the menu bars corresponding to the menu dialogue without the corrected data and a second set of the menu bars corresponding to the menu dialogue with the corrected data, which are included in the navigation menu, the first and second sets of the menu bars being differently from each other.

2. The system of claim 1, further comprising a data storage configured to store data for displaying the menu dialogues and the navigation menu on the screen.

3. The system of claim 2, further comprising a user interface data processor configured to read a screen display data from the data storage.

4. The system of claim 3, wherein
if the user selects one of the menu dialogues, the navigation controller transmits to the user interface data processor a request signal for data to display the selected menu dialogue on the screen; and
the user interface data processor reads the screen display data from the data storage in response to the request signal and provides the read screen display data to the navigation controller.

5. The system of claim 1, wherein the display driver displays a currently-accessed menu dialogue and the navigation menu in a top side region of the screen.

6. A method for controlling a semiconductor manufacturing equipment, comprising:
loading a user interface including menus for controlling, monitoring and managing the semiconductor manufacturing equipment;
displaying a screen for selecting one of the menus; and
displaying a navigation menu for registering the selected menus on the screen in the order of history, wherein
the displaying of the navigation menu includes,
displaying the navigation menu in a type of menu bars, each of the menu bars corresponding to a respective menu selected by the user, and
displaying the menu bars corresponding to the menu among the selected menus including data corrected by the user and the menu bars corresponding to the menu without the corrected data, differently from each other, the menu bars including a first set of the menu bars with corrected data and a second set of the menu bars without the corrected data, the first and second sets of the menu bars being different from each other.

7. The method of claim 6, wherein the displaying of the navigation menu comprises:
disposing the navigation menu in a top side portion of the screen.

8. The method of claim 7, wherein the displaying of the navigation menu comprises:
registering and displaying a new menu bar in the navigation menu when a conversion is made from a currently-accessed menu to another menu corresponding to each of the menus selected by the user.

9. The method of claim 6, wherein the displaying of the navigation menu comprises:
displaying the menu bars corresponding to the menu including the corrected data in the same manner as the menu bars corresponding to the menu without the corrected data if the corrected data are stored by the user.

10. The method of claim 6, further comprising:
storing the corrected data before the conversion.

11. A method for controlling a semiconductor manufacturing equipment by means of a user interface including menu dialogues of menus for controlling, monitoring and managing the semiconductor manufacturing equipment, the method comprising:
loading the user interface;
displaying a screen, the screen being one of the menu dialogues;
enabling a navigation menu for displaying menu dialogues selected by a user;
registering, upon selecting one or more of the menu dialogues, the selected menu dialogues in the navigation menu in an order of history; and
determining whether corrected data are present in the previous menu dialogue, if a conversion is made from the previous menu dialogue to one of the menu dialogues registered and displayed in the navigation menu,
wherein the navigation menu displays a first set of the menu bars with the corrected data and a second set of the menu bars without the corrected data, the first and second sets of the menu bars being different from each other.

12. The method of claim 11, wherein the enabling of the navigation menu comprises:
displaying each of the menu dialogues, accessed by the user, in the navigation menu in a menu bar type.

13. The method of claim 12, wherein the screen conversion is configured to be converted between the menu dialogues registered and displayed in the navigation menu.

14. The method of claim 11, further comprising:
automatically storing the corrected data if the corrected data are present in the previous menu dialogue.

15. The method of claim 11, wherein the navigation menu displays the first set of the menu bars with the corrected data in the same manner as the second set of the menu bars without the corrected data if the corrected data are stored.

16. The method of claim 11, wherein the navigation menu is displayed in a top side region of the screen.

\* \* \* \* \*